(12) United States Patent
Heitzmann

(10) Patent No.: US 6,176,478 B1
(45) Date of Patent: Jan. 23, 2001

(54) RUBBER SHEAR SPRING ADD-ON ASSEMBLY FOR LEAF SPRING AND METHOD RELATING THERETO

(75) Inventor: David E. Heitzmann, Union, MI (US)

(73) Assignee: MOR/ryde International, Inc., Elkhart, IN (US)

( * ) Notice: Under 35 U.S.C. 154(b), the term of this patent shall be extended for 0 days.

(21) Appl. No.: 09/081,184

(22) Filed: May 19, 1998

(51) Int. Cl.[7] .................................................. B60G 11/12
(52) U.S. Cl. ........................ 267/269; 267/271; 267/30
(58) Field of Search ............................ 267/3, 257, 294, 267/140.3, 140.4, 141.1, 269, 270, 271, 30, 263, 41, 265, 37.1, 37.3

(56) References Cited

U.S. PATENT DOCUMENTS

| | | | |
|---|---|---|---|
| 1,761,967 | * 6/1930 | Blackmore | 267/270 |
| 1,827,284 | * 10/1931 | Dootson | 267/270 |
| 1,925,713 | * 9/1933 | Crist | 267/37.1 |
| 3,087,716 | * 4/1963 | Nilson | 267/30 |
| 4,213,633 | * 7/1980 | Moore | 280/716 |
| 5,465,997 | 11/1995 | Heitzmann | 280/716 |

FOREIGN PATENT DOCUMENTS 2846608    5/1979   (DE) .................................... 280/716

* cited by examiner

*Primary Examiner*—Douglas C. Butler
*Assistant Examiner*—Xuan Lan Nguyen
(74) *Attorney, Agent, or Firm*—Joseph P. Gastel

(57) ABSTRACT

A rubber shear spring add-on assembly for the leaf spring of an automotive vehicle, the rubber shear spring add-on assembly being connected between the rear end of the leaf spring and the frame, the rubber shear spring add-on assembly including a spring carrier assembly mounting the rear end of the leaf spring, a hanger assembly mounted on the frame member and a rubber shear spring mounted between the hanger assembly and the spring carrier assembly which is mounted on the rear end of the leaf spring.

33 Claims, 3 Drawing Sheets

RUBBER SHEAR SPRING ADD-ON ASSEMBLY FOR LEAF SPRING AND METHOD RELATING THERETO

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates to a rubber shear spring add-on assembly for a leaf spring and a method relating thereto.

Certain vehicles have leaf springs for the rear wheels. However, many times these springs are too stiff for the load that is to be carried by the vehicle. In the past, insofar as known, if springs of lesser stiffness were required, it was necessary to replace the stiff leaf springs with leaf springs which were less stiff. This involved the expense of purchasing the less stiff springs and the labor involved in replacing the original stiff springs. In addition, the original stiff springs usually went to waste. It is with overcoming the foregoing deficiency of the prior art that the present invention is concerned.

BRIEF SUMMARY OF THE INVENTION

It is the object of the present invention to provide a rubber shear spring add-on assembly for an undesirably stiff leaf spring on an automotive vehicle to thereby essentially modify the stiff leaf spring to a spring of less stiffness.

It is another object of the present invention to provide a rubber shear spring add-on assembly for a stiff leaf spring of a vehicle which can be installed in a relatively simple manner without requiring extensive disassembly of the stiff leaf spring from the vehicle.

A further object of the present invention is to provide a rubber shear spring add-on assembly for a leaf spring of a vehicle which does not require replacement of the leaf spring in any respect.

A still further object of the present invention is to provide a method of modifying a leaf spring to essentially produce a lower spring rate. Other objects and attendant advantages of the present invention will readily be perceived hereafter.

The present invention relates to an improvement in an automotive vehicle having first and second spaced frame members, first and second leaf springs having first and second ends with said first ends mounted on said first and second frame members, respectively, wherein the improvement comprises a rubber shear spring mounted in series between each of said second ends of said first and second leaf springs and said first and second frame members, respectively.

The present invention also relates to a modifier for a leaf spring comprising a hanger, a leaf spring carrier, and a rubber shear spring mounted between said hanger and said leaf spring carrier.

The present invention also relates to a method of modifying a leaf spring having first and second ends mounted on the frame of a vehicle comprising the steps of disconnecting said second end of said leaf spring from said frame, and connecting a rubber shear spring between said frame and said second end of said leaf spring.

The various aspects of the present invention will be more fully understood when the following portions of the specification are read in conjunction with the accompanying drawings wherein:

DETAILED DESCRIPTION OF THE INVENTION

By way of background, the rubber shear spring add-on assembly 10 of the present invention is placed in series with an existing leaf spring of a vehicle for the purpose of softening the ride produced by that vehicle when the vehicle frame has a body thereon which is built to carry a load which is less than the minimum load for which the existing leaf springs on the frame were intended to carry. In this respect, in the motor home industry, vehicle frames which include a cab, engine drive assembly and frame are purchased from a vehicle manufacturer. The frame includes two spaced frame members which extend rearwardly of the cab, and the motor home manufacturer builds a motor home body onto these rearwardly extending frame members. It has been found, however, that the motor home body is of less weight than the minimum weight for which the leaf springs have been designed. Accordingly, the ride experienced by the completed motor home is thus relatively stiff, which is undesirable. It is with the modifying of an existing leaf spring of a vehicle to provide a softer ride that the present invention is concerned.

Figure 1:
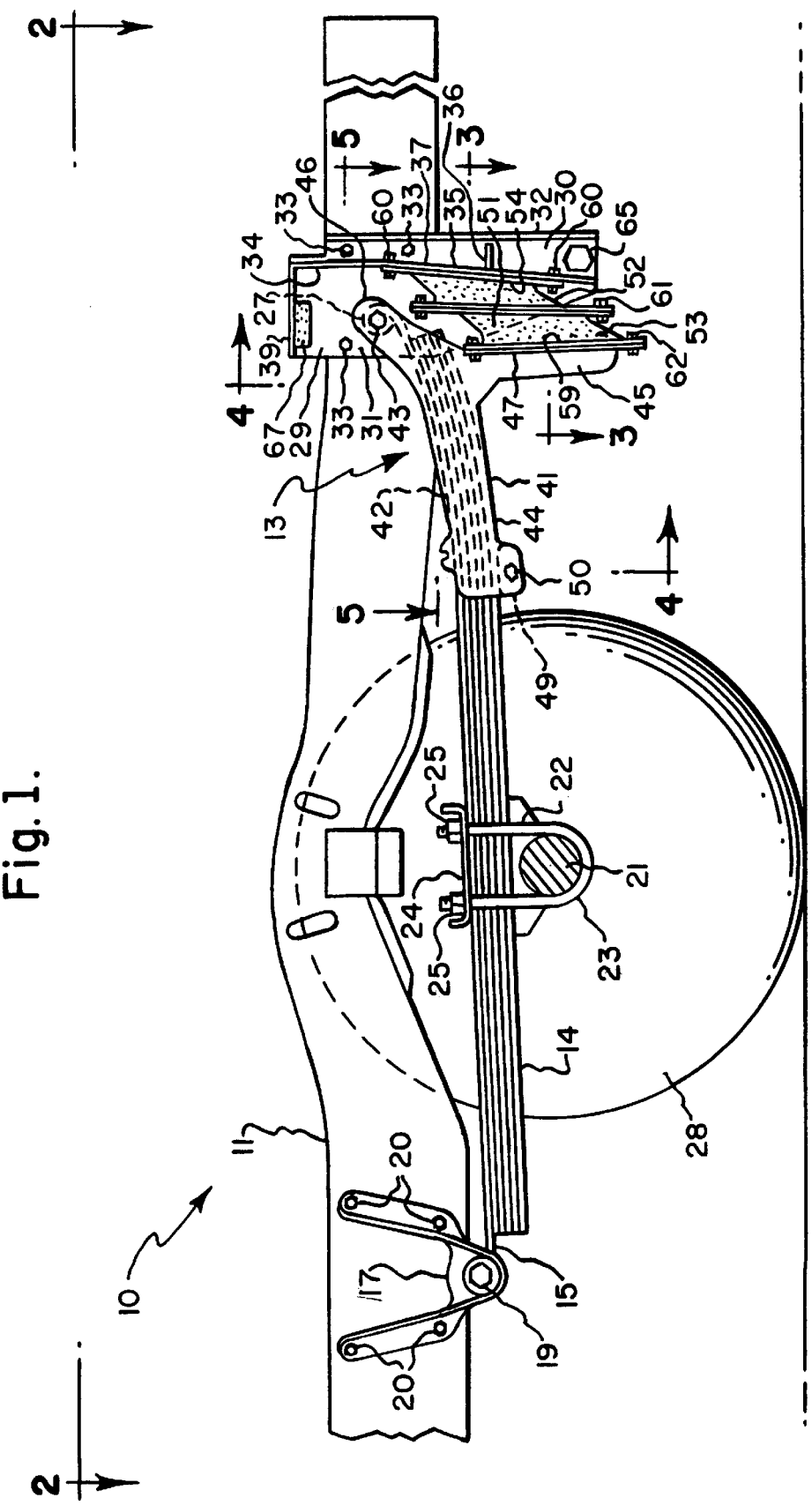
FIG. 1 is a fragmentary enlarged cross sectional view taken substantially along line 1—1 of FIG. 2 and showing the rubber shear spring add-on assembly of the present invention mounted between one end of the existing leaf spring of a vehicle and the frame of the vehicle.
Figure 2:
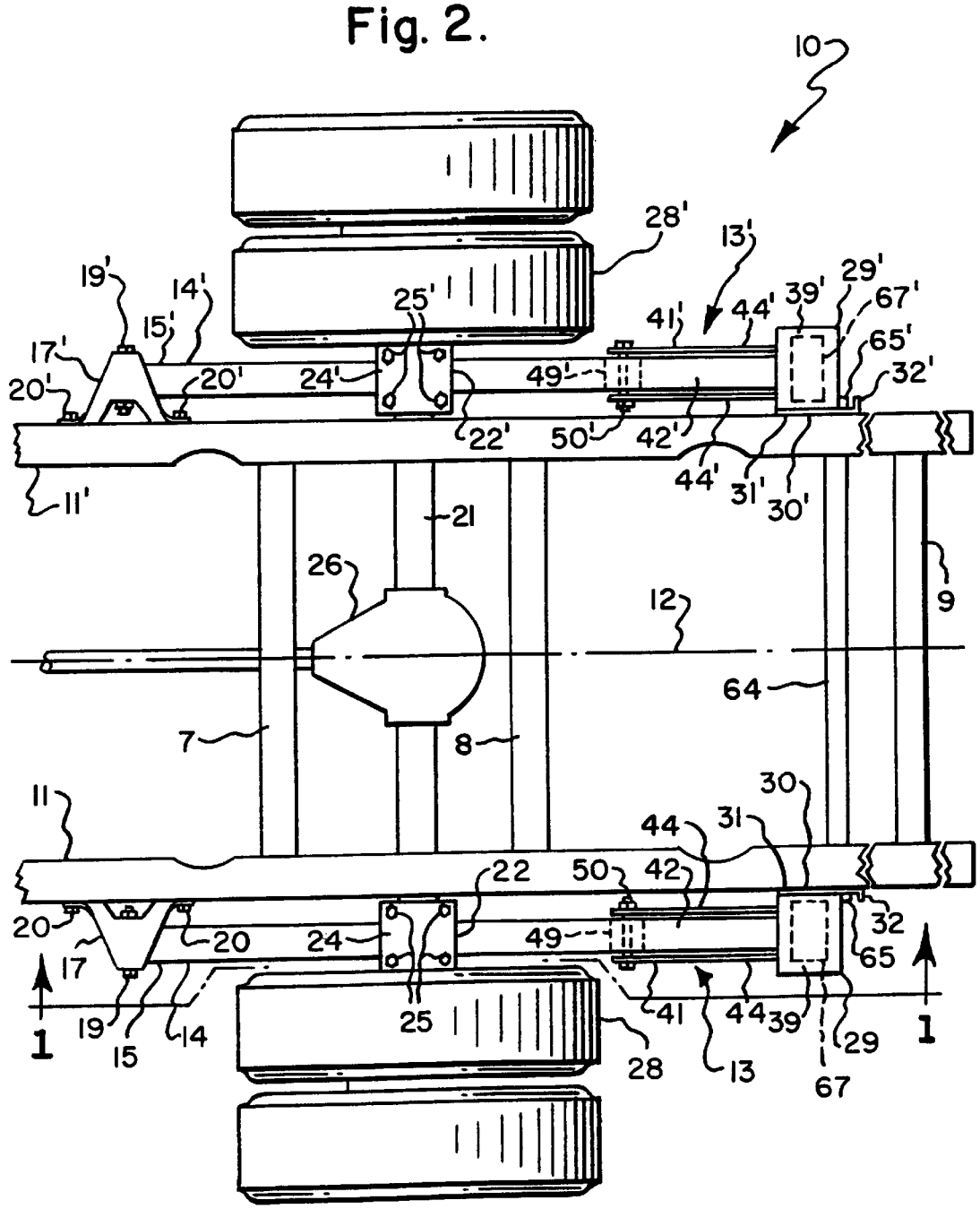
FIG. 2 is a fragmentary reduced plan view taken substantially in the direction of arrows 2—2 of FIG. 1.

In FIGS. 1 and 2 an automotive vehicle 10 is shown having spaced frame members 11 and 11' which extend rearwardly from a cab (not shown) and an engine (not shown). It is to be noted that there is a centerline 12 between frame members 11 and 11' and that the parts of the vehicle on opposite sides of the centerline 12 are mirror image counterparts of each other. Accordingly, for the sake of simplicity of description, the structure of the parts of the vehicle corresponding to those shown in FIG. 1 will be designated by unprimed numerals and the corresponding mirror image counterparts on the other side of centerline 12 will merely be designated with primed numerals without an accompanying description, it being understood that the parts designated by primed numerals are mirror image counterparts of those described with unprimed numerals. However, when certain parts of the rubber shear spring add-on assemblies 13 and 13' are identical on both sides of the centerline 12, they will be designated by unprimed numerals.

Leaf springs 14, which are originally installed on the vehicle, are mounted on frame members 11 and 11' which are connected to each other by frame members 7, 8 and 9. Spring 14 has an end 15 facing the front of the vehicle, and it is secured to bracket 17 by means of a bolt 19 which extends through a loop (not shown) at the end of spring 14. Bracket 17 is secured to frame 11 by a plurality of bolts 20. The foregoing is the standard type of mounting arrangement provided with the vehicle.

The vehicle includes an axle 21 having opposite ends which are secured to the central portion of leaf springs 14 by U-bolt assemblies 22 and 22' wherein each assembly has two U-bolts 23 with each U-bolt being located on opposite sides of the leaf spring 14. Brackets 24 and 24' are located on top of the leaf springs 14 to receive the ends of the U-bolts with the nuts 25 of the U-bolts bearing on top of brackets 24 and 24'. A differential 26 is associated with axle 21 in the conventional manner, and wheel units 28 are secured to the outer ends of axle 21.

Figure 3:
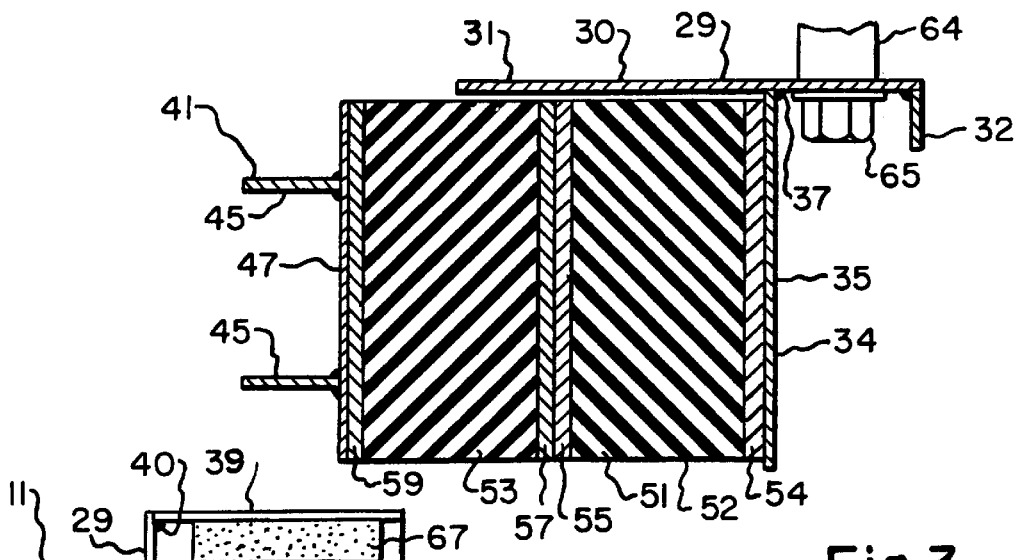
FIG. 3 is a fragmentary enlarged cross sectional view taken substantially along line 3—3 of FIG. 1 and showing the rubber shear spring assembly mounted between the frame mounting plate which is mounted on the vehicle frame and the spring mounting plate which mounts one end of the leaf spring to the rubber shear spring.

In accordance with the present invention, the loop end 27 of leaf spring 14 is disconnected from the bracket which normally secures it to frame 11 and this bracket (not shown) is discarded and replaced by the rubber shear spring add-on assembly 13 of the present invention. The rubber shear spring add-on assembly 13 includes a hanger assembly 29 which includes a frame mounting plate 30 having a planar sheet-like portion 31 which terminates at a flange 32 (FIGS. 1 and 3). The planar portion 31 is secured to the outside of vehicle frame member 11 by means of four bolts 33 which pass through planar portion or plate 31 and preexisting holes in frame 11 which previously supported a bracket such as 17. A rubber shear spring mounting plate 34 includes a plate-like member 35 (FIG. 4) which is welded to planar portion or plate 31 along their joining portions which is depicted at 37 (FIG. 3). A brace plate 36 is welded between plate 31 and plate-like member 35. The spring mounting plate 34 also includes a top plate 39 (FIGS. 1, 2 and 4) which is welded to plate 31 along their common joint 40. The top plate 39 is a bent-over portion of plate 34.

Figure 4:
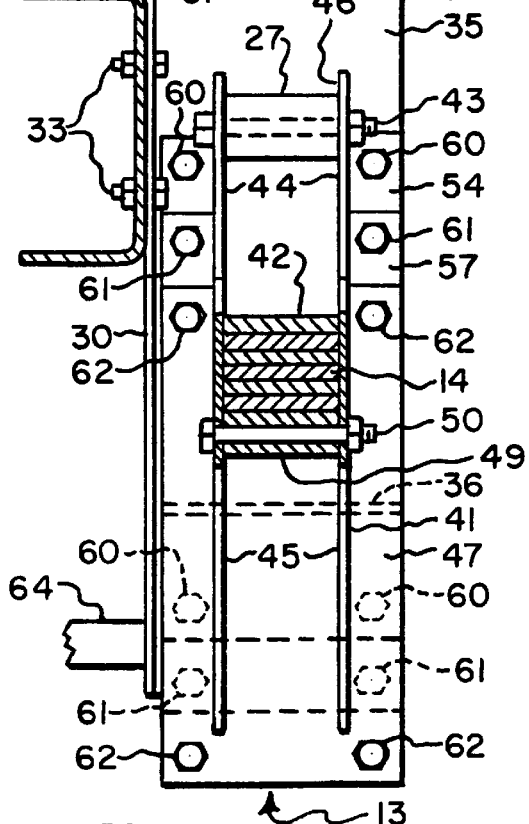
FIG. 4 is a fragmentary cross sectional view taken substantially along line 4—4 of FIG. 1.
Figure 5:
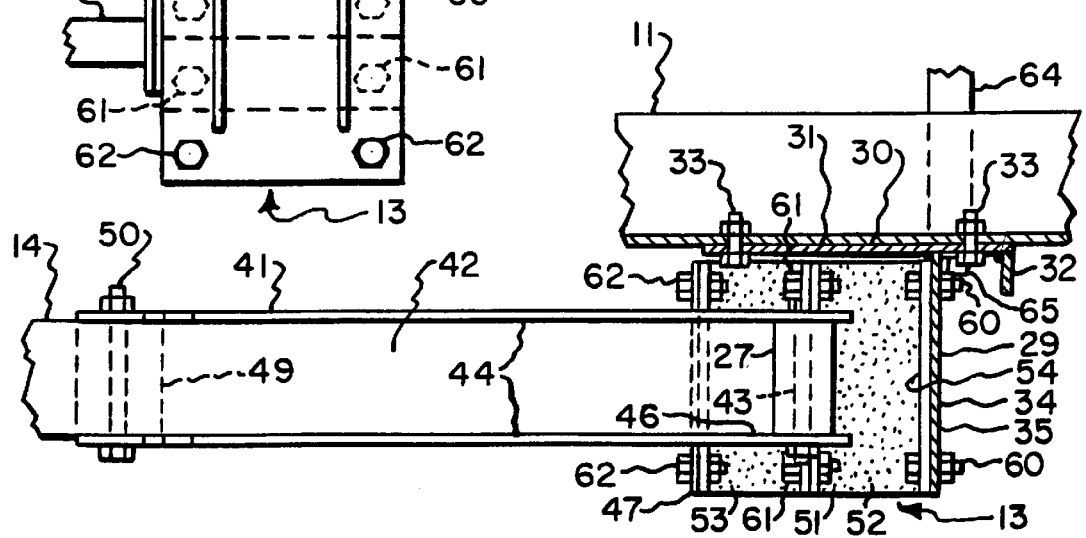
FIG. 5 is a fragmentary cross sectional view taken substantially along line 5—5 of FIG. 1.

A spring carrier assembly 41 mounts the end 42 of leaf spring 14. In this respect, a bolt 43 (FIGS. 1, 4 and 5) passes through loop 27 of leaf spring 14 and also passes through the leaf spring attachment portion 46 of side plates or sides 44 of spring carrier assembly 41 with the end 42 of leaf spring 14 lying between side plates 44. The side plates 44 have depending leg portions 45 which are welded to spring carrier plate 47 (FIG. 4). A block 49 (FIGS. 1, 4 and 5) is located at the left ends of side plates 44 and a bolt 50 (FIGS. 4 and 5) passes through side plates 44 and a bore in spring support block or member 49. Thus, the upper portions of side plates 44 are connected by bolt or member 43 and loop end 27, and the lower ends of sides 44 are connected by block 49 and bolt 50. The block 49 pivots on bolt 50 so that its upper surface bears squarely on the underside of the leaf spring as the latter flexes.

A rubber shear spring 51 is connected between the plate-like member 35 of the spring mounting plate 34 and the spring carrier assembly 41. The rubber shear spring 51 consists of two rubber block members 52 and 53. Rubber block 52 is bonded between rubber shear spring plates 54 and 55, and rubber block 53 is bonded between rubber shear spring plates 57 and 59 (FIG. 3). Plate 54 is secured to plate-like member 35 of spring mounting plate 34 by a plurality of bolts 60. Plates 55 and 57 are secured to each other by a plurality of bolts 61. Plate 59 is secured to plate 47 by a plurality of bolts 62. Thus, the rubber shear spring 51 connects the spring carrier assembly 41 to the hanger assembly 30 so that the end 42 of leaf spring 14 is mounted on frame member 11 through the rubber shear spring rather than being mounted directly on frame member 11. The rubber blocks 52 and 53 are shown slightly distorted in FIG. 1, as these are the shapes which they assume when they are installed on the bare frame of the vehicle. However, it will be understood that when the rubber shear spring is in its pre-installed condition, the plates 54, 55, 57 and 59 are parallel to each other.

A hollow rod 64 (FIG. 2) extends between plates 31 of frame mounting plates 30 and 30', and bolts 65 and 65' are threaded into the ends of tubular member 64. Thus, tubular member 64 stabilizes the lower ends of plates 31 relative to each other.

The top plate 39 is directly above loop 27 of leaf spring 14 (FIGS. 1 and 4). If the remote situation occurs that the rubber shear spring 51 should break, the loop 27 of leaf spring 14 will abut the underside of the rubber pad 67 which is bonded to the underside of top plate 39, and thus the end 44 of the leaf spring 14 will support the adjacent part of frame 11.

In an actual installation, the leaf spring had a spring rate of 1000 pounds per inch and the rubber shear spring had a spring rate of 750 pounds per inch, and the foregoing relationship caused greater axle movement per given load than if the leaf spring were carrying the load by itself, this being achieved by essentially producing a lower spring rate.

It can thus be seen that the rubber shear spring add-on assembly 13 of the present invention provides a series connection between the rear end of a leaf spring and the frame of a vehicle so that the leaf spring is essentially modified to produce a lower spring rate which, in turn, produces a softer riding vehicle.

While a preferred embodiment of the present invention has been disclosed, it will be appreciated that it is not limited thereto but may be otherwise embodied within the scope of the following claims.

What is claimed is:

1. In an automotive vehicle having first and second spaced frame members, first and second leaf springs having first and second ends with said first ends of said first and second leaf springs being mounted on said first and second frame members, respectively, and an axle mounted on said first and second leaf springs with a free span of said first and second leaf springs between said axle and said second ends of said first and second leaf springs, respectively, wherein an improvement comprises a rubber shear spring assembly mounted between each of said second ends of said first and second leaf springs and said first and second frame members, respectively.

2. In an automotive vehicle as set forth in claim 1 wherein each of said rubber shear spring assemblies comprise first and second hanger assemblies mounted on said first and second frame members, respectively, first and second rubber shear springs mounted on said first and second hanger assemblies, respectively, and first and second leaf spring carriers coupled between said second ends of said first and second leaf springs and said first and second rubber shear springs, respectively.

3. In an automotive vehicle as set forth in claim 2 wherein said first and second hanger assemblies comprise first and second frame mounting plates secured to said first and second frame members, respectively, and first and second rubber shear spring mounting plates extending transversely to said first and second frame mounting plates, respectively, on which said first and second rubber shear springs, respectively, are mounted.

4. In an automotive vehicle as set forth in claim 3 wherein said first and second rubber shear springs comprise first and second rubber shear spring plates mounted on said first and second spring mounting plates, respectively, of said first and second hanger assemblies, respectively.

5. In an automotive vehicle as set forth in claim 4 wherein said first and second rubber shear springs include third and fourth rubber shear spring plates, respectively, mounting said first and second leaf spring carriers, respectively.

6. In an automotive vehicle having first and second spaced frame members, first and second leaf springs having first and second ends with said first ends mounted on said first and second frame members, respectively, wherein an improvement comprises a rubber shear spring assembly mounted between each of said second ends of said first and second leaf springs and said first and second frame members, respectively, each of said rubber shear spring assemblies comprising first and second hanger assemblies mounted on said first and second frame members, respectively, first and second rubber shear springs mounted on said first and second hanger assemblies, respectively, and first and second leaf spring carriers coupled between said second ends of said first and second leaf springs and said first and second rubber shear springs, respectively, said first and second hanger assemblies comprising first and second frame mounting plates secured to said first and second frame members, respectively, and first and second rubber shear spring mounting plates extending transversely to said first and second frame mounting plates, respectively, on which said first and second rubber shear springs, respectively, are mounted, said first and second rubber shear springs comprising first and second rubber shear spring plates mounted on said first and second spring mounting plates, respectively, of said first and second hanger assemblies, respectively, said first and second rubber shear springs including third and fourth rubber shear spring plates, respectively, mounting said first and second leaf spring carriers, respectively, said first and second leaf spring carriers comprising a first and second spring carrier plate, respectively, secured to said third and fourth rubber shear spring plates, respectively.

7. In an automotive vehicle as set forth in claim 6 wherein said first and second spring carriers further comprise first and second pairs of side plates bracketing said second ends of said first and second leaf springs, respectively.

8. In an automotive vehicle as set forth in claim 7 wherein said first and second pairs of side plates each include first portions proximate said first and second rubber shear springs, respectively, and second portions remote from said first and second rubber shear springs, respectively, and first and second spring support members mounted on said second portions of said first and second pairs of side plates and underlying said second ends of said first and second leaf springs, respectively.

9. In an automotive vehicle as set forth in claim 8 wherein said second ends of said first and second leaf springs are pivotally mounted on said first and second spring carriers, respectively.

10. A modifier for a leaf spring having first and second ends comprising a hanger, a leaf spring carrier, a rubber shear spring mounted between said hanger and said leaf spring carrier, and a bolt on said leaf spring carrier and extending transversely to said leaf spring for pivotally mounting said second end of said leaf spring on said leaf spring carrier.

11. A modifier for a leaf spring as set forth in claim 10 wherein said hanger comprises a frame mounting plate, and a rubber shear spring mounting plate extending transversely to said frame mounting plate.

12. A modifier for a leaf spring as set forth in claim 11 wherein said rubber shear spring has first and second opposite sides, and wherein said first side of said rubber shear spring is mounted on said rubber shear spring mounting plate, and wherein said leaf spring carrier is mounted on said second side of said rubber shear spring.

13. A modifier for a leaf spring as set forth in claim 10 wherein said carrier includes side plates for bracketing said second end of said leaf spring.

14. A modifier for a leaf spring comprising a hanger, a leaf spring carrier, and a rubber shear spring mounted between said hanger and said leaf spring carrier, said leaf spring carrier including a first portion for pivotally mounting the end of a leaf spring and a second portion for mounting on said rubber shear spring and a third portion for bracketing a portion of a leaf spring proximate said end of said leaf spring.

15. A modifier for a leaf spring as set forth in claim 14 wherein said leaf spring carrier includes a support for underlying said end of said leaf spring.

16. A modifier for a leaf spring as set forth in claim 15 wherein said third portion of said spring carrier comprise spaced side plates.

17. A modifier for a leaf spring as set forth in claim 15 wherein said support is coupled between said spaced side plates which is remote from said first portion.

18. A modifier for a leaf spring comprising a hanger, a leaf spring carrier, and a rubber shear spring mounted between said hanger and said leaf spring carrier, said hanger comprising a frame mounting plate, and a rubber shear spring mounting plate extending transversely to said frame mounting plate, said rubber shear spring having first and second opposite sides, and said first side of said rubber shear spring being mounted on said rubber shear spring mounting plate, and said leaf spring carrier being mounted on said second side of said rubber shear spring, said leaf spring carrier including two sides extending outwardly away from said rubber shear spring, and a leaf spring support member mounted between said sides.

19. A modifier for a leaf spring comprising a hanger, a leaf spring carrier, and a rubber shear spring mounted between said hanger and said leaf spring carrier, said hanger comprising a frame mounting plate, and a rubber shear spring mounting plate extending transversely to said frame mounting plate, said rubber shear spring having first and second opposite sides, and said first side of said rubber shear spring being mounted on said rubber shear spring mounting plate, and said leaf spring carrier being mounted on said second side of said rubber shear spring, a leaf spring attachment portion on said leaf spring carrier, said leaf spring carrier including two sides extending outwardly away from said rubber shear spring, and a leaf spring support member mounted between said sides.

20. A modifier for a leaf spring comprising a hanger, a leaf spring carrier, and a rubber shear spring mounted between said hanger and said leaf spring carrier, said hanger comprising a frame mounting plate, and a rubber shear spring mounting plate extending transversely to said frame mounting plate, said rubber shear spring having first and second opposite sides, and said first side of said rubber shear spring being mounted on said rubber shear spring mounting plate, and said leaf spring carrier being mounted on said second side of said rubber shear spring, a leaf spring attachment portion on said leaf spring carrier, and a top plate extending outwardly from said frame mounting plate and overlying said leaf spring attachment portion.

21. In an automotive vehicle having first and second spaced frame members, first and second leaf springs having first and second ends with said first ends of said first and second leaf springs being mounted on said first and second frame members, respectively, and an axle mounted on said first and second leaf springs with a free span of said first and second leaf springs between said axle and said second ends of said first and second leaf springs, respectively, wherein an improvement comprises a rubber shear spring mounted in series between each of said second ends of said first and second leaf springs and said first and second frame members, respectively.

22. In an automotive vehicle as set forth in claim 21 including first and second hangers mounted on said first and second frame members, respectively, said first and second rubber shear springs being mounted on said first and second hangers, respectively, and first and second leaf spring carriers coupled between said second ends of said first and second leaf springs and said first and second rubber shear springs, respectively.

23. In an automotive vehicle as set forth in claim 21 including first and second frame mounting plates secured to said first and second frame members, respectively, first and second rubber shear spring mounting plates extending transversely to said first and second frame mounting plates, respectively, on which said first and second rubber shear springs, respectively, are mounted.

24. In an automotive vehicle as set forth in claim 23 including first and second leaf spring carriers coupled between said first and second rubber springs, respectively, and said second ends of said leaf springs.

25. A method of modifying a leaf spring having first and second ends mounted on the frame of a vehicle comprising the steps of disconnecting said second end of said leaf spring from said frame, and connecting a rubber shear spring assembly between said frame and said second end of said leaf spring by mounting a hanger on said frame with said hanger having a rubber shear spring thereon and a leaf spring carrier mounted on said rubber shear spring, and thereafter pivotally mounting said second end of said leaf spring on said leaf spring carrier to provide a series connection between the second end of the leaf spring and the frame of the vehicle so that the leaf spring is essentially modified to produce a lower spring rate than is provided by said leaf spring.

26. In an automotive vehicle having first and second spaced frame members, first and second leaf springs having first and second ends with said first ends of said first and second leaf springs mounted on said first and second frame members, respectively, and an axle mounted on said first and second leaf springs wherein an improvement comprises a first rubber shear spring assembly mounted between said second end of said first leaf spring and said first frame member, a second rubber shear spring assembly mounted between said second end of said second leaf spring and said second frame member, a free span of said first and second leaf springs between said axle and said second ends of said first and second rubber shear spring assemblies, respectively, and a rod extending between said first and second rubber shear spring assemblies.

27. In an automotive vehicle as set forth in claim 26 wherein said first and second rubber shear spring assemblies include first and second hangers, respectively, and wherein said rod extends between said first and second hangers.

28. A modifier for a leaf spring having first and second ends comprising a hanger, a leaf spring carrier, a rubber shear spring mounted between said hanger and said leaf spring carrier, a bolt for mounting said second end of said leaf spring on said leaf spring carrier, side plates on said carrier for bracketing said second end of said leaf spring, and a block on said carrier between said side plates remote from said bolt.

29. A modifier for a leaf spring as set forth in claim 28 including a second bolt pivotally mounting said block between said side plates.

30. A modifier for a leaf spring having first and second ends comprising a hanger, a leaf spring carrier, a rubber shear spring mounted between said hanger and said leaf spring carrier, and side plates on said carrier for lying on opposite sides of a free span of said leaf spring proximate said second end of said leaf spring.

31. A modifier for a leaf spring having first and second ends comprising a hanger, a leaf spring carrier, a rubber shear spring mounted between said hanger and said leaf spring carrier, side plates on said carrier for lying on opposite sides of said second end of said leaf spring, said side plates including portions remote from said rubber shear spring, and a block between said remote portions of said side plates.

32. A modifier for a leaf spring as set forth in claim 31 wherein said block is pivotally mounted between said side plates.

33. In an automotive vehicle having first and second spaced frame members, first and second leaf springs having first and second ends with said first ends of said first and second leaf springs being mounted on said first and second frame members, respectively, and an axle mounted on said first and second leaf springs wherein an improvement comprises first and second rubber shear springs mounted between each of said second ends of said first and second leaf springs and said first and second frame members, respectively, and a free span of said first and second leaf springs between said axle and said first and second rubber shear springs, respectively.

* * * * *